Patented Oct. 20, 1936

2,058,373

UNITED STATES PATENT OFFICE 2,058,373

MANUFACTURE OF PHENYLETHYL ALCOHOL OR ITS HOMOLOGOUS COMPOUNDS

Albert Weissenborn, Dessau in Anhalt, Germany, assignor to Winthrop Chemical Company, Inc., New York, N. Y., a corporation of New York No Drawing. Application September 11, 1935, Serial No. 40,095. In Germany February 24, 1932

4 Claims. (Cl. 260—153)

My present invention relates to a process for manufacturing phenylethyl alcohol or its homologous compounds, and more particularly to a process according to which phenyl magnesium chloride is treated with ethylene oxide, and the reaction product is decomposed in known manner to form phenylethyl alcohol.

One of its objects is a new method of forming the organo-magnesium compound of chlorobenzene or its homologous compounds serving as an intermediate product.

It is well known in the art that difficulties arise when trying the condensation of chlorobenzene and magnesium in order to form the corresponding organo-magnesium compound; contrary to the reactivity of bromo- or iodo-benzene the aromatic chloro compounds do not react with magnesium without specific precautions (cf. Berichte der deutschen Chemischen Gesellschaft, vol. 38, page 2760; Beilstein, 4th edition, vol. 5, page 200.

According to researches published in Rec. Trav. Chim., vol 49 (1930), page 717, phenylmagnesium chloride may be produced by treating a solution of chlorobenzene of 25 per cent. strength in absolutely dry ether with a copper magnesium alloy containing about 12¾ per cent. of copper, said alloy being activated with iodine (Rec. Trav. Chim., vol. 47 (1928), page 19; Bul. Soc. Chim., vol. 45 (1929), page 250). The reaction begins after about 4 to 11 days, copper magnesium alloy activated with iodine being continuously added, and may be finished in further 2 to 4 days. This procedure is without technical value, since besides the long time of reaction the working with absolutely dry ether is expensive and dangerous.

Furthermore, it has been tried to form the magnesium compound of chlorobenzene in the absence of ether. Thus, phenylmagnesium chloride has been obtained in small quantities by heating chlorobenzene and magnesium for 3 hours in a closed tube. Heating for 4 hours to 140° C. did not produce the desired product (Journ. of the American Chemical Society, vol. 52 (1930), page 3330; Rec. Trav. Chim., vol. 51 (1932), page 48). Similar researches have been published in Berichte der deutschen Chemischen Gesellschaft, vol. 64 (1931) page 2584, where the condensation of chlorobenzene and magnesium under pressure in a closed vessel at about 150 to 180° C. is described. The addition of one of the known agents activating the formation of organo-magnesium compounds is without effect in this case.

Furthermore, reference is made to the publication in Berichte der deutschen Chemischen Gesellschaft, vol. 64 (1931), page 739, which indicates that the condensation of chlorobenzene or even of the higher active bromo- and iodo-benzene with magnesium cannot be performed under ordinary pressure in the absence of ether.

Now, I have found that the formation of the Grignard compound of chlorobenzene or its homologous compounds can be performed in a short time and without addition of the expensive and dangerous dry ether at ordinary pressure, that means, without operation in an autoclave. According to my invention, phenylmagnesium chloride can be produced when heating chlorobenzene under reflux to the boiling point, that is, to 132° C. during about 5 hours or less, together with an especially prepared magnesium. I have found that the reactivity of magnesium depends on the form of its surface. Thus, freshly produced turnings of magnesium or freshly prepared powders of magnesium show an excellent reactivity towards chlorobenzene, if they have a clean, unoxidized surface whereas commercial magnesium turnings and those recommended for the Grignard reaction, may be boiled for days with chlorobenzene without commencement of a reaction. Contrary thereto, the freshly prepared magnesium turnings or powders or such stored under certain conditions react in a short time with chlorobenzene. The inoperativeness of the common magnesium turnings or powders is caused by traces of oils and by the action of acids as, for instance, carbonic acid contained in the air, by moisture or by the oxygen of the air. Therefore, freshly prepared magnesium determined for the production of the Grignard compound of chlorobenzene, must be carefully stored, for instance, in a vacuum or under a dry inert gas, such as hydrogen or nitrogen in order to preserve its reactivity.

Furthermore, it becomes possible according to my invention to reactivate the magnesium which has lost its activity. This reactivation may be carried out by adding to the chlorobenzene in which the magnesium has been introduced, a metal halide or the halide of a metalloid. As such an activator I enumerate, for instance, cuprous chloride, cuprous bromide, cuprous iodide, silver chloride, silver bromide, aluminum chloride or bromide, anhydrous magnesium chloride or bromide, phosphorus tribromide or mixtures of such activators, if desired, with addition of iodine. In the same manner organo-magnesium halides are suitable for activating the magnesium.

The following examples serve to illustrate my invention, the parts being by weight:—

*Example 1.*—100 parts of freshly prepared magnesium turnings having a clean, unoxidized surface and which preferably are in form of thin, small strips, are heated together with 400 parts of chlorobenzene to the boiling point of the latter. After about 20 minutes, the reaction begins, whereby the liquid becomes turbid. The heat freed by the exothermic reaction, generally suffices to continue boiling of the liquid, if no heat is lost by radiation; otherwise, the reaction mixture is held at the boiling point by weakly heating. After some time, about 1000 parts of chlorobenzene are added to the mixture serving as a suspending agent for the separated organo magnesium compound. After about 4 hours, the reaction is finished.

Instead of chlorobenzene its homologous compounds may be transformed into the corresponding organo-magnesium compounds. Other highly boiling inert liquids, such as xylene, aliphatic hydrocarbons, decahydro or tetrahydro naphthalenes may be used as a diluent or suspending agent.

In order to avoid a too turbulent reaction, the desired amount of chlorobenzene may be added to the magnesium in several portions.

*Example 2.*—100 parts of magnesium turnings which have lost the high activity of their surface, are introduced in 400 parts of clorobenzene together with 2.4 parts of cuprous chloride and the mixture is boiled under reflux, while stirring. After about 2 hours, the liquid begins to become turbid and the organo-magnesium chloride compound separates. After further heating for about 3 to 4 hours, the chlorobenzene is consumed by the reaction and 500 parts of a greyish yellow powder-like substance are obtained which is soluble for the greater part in ether or in a mixture consisting of ether and benzene and which shows the reactivity of the Grignard compounds. In the foregoing example the surface activating copper chloride, may be substituted by one of the other activators mentioned above. Instead of the magnesium turnings, magnesium alloys, for example such containing 2 per cent. of zinc and/or 1 to 2 per cent. of copper may be used in the form as they are obtained as a waste in the working up of technical magnesium alloys.

In an analogous manner the homologous compounds of chlorobenzene such as, for instance, chlorotoluene, may be converted into the corresponding organo-magnesium compound.

*Example 3.*—400 parts of chlorobenzene are mixed with 20 parts of bromobenzene and heated in the presence of 100 parts of magnesium turnings under reflux to the boiling point. In this case, in the first stage the magnesium compound of bromobenzene is formed which acts as an activator so that the whole quantity of the chlorobenzene can be converted into the organo-magnesium compound. This second reaction occurs very quickly, so that already after about 3 hours the total quantity of halogenobenzene is consumed. In this case, likewise, a yellow grey powder-like substance is obtained showing the same qualities as that described in the foregoing example.

*Example 4.*—Into 100 parts of chlorobenzene 100 parts of magnesium are introduced and the liquid is heated to boiling under reflux with addition of 2.5 parts of aluminum bromide. After the reaction has begun, recognizable on a turbidity, 300 parts of chlorobenzene are added in about 2 hours, the reaction mixture being kept at the boiling point. By an adjustment of the quantity of the chlorobenzene introduced into the mixture continuance of boiling is easily attainable.

*Example 5.*—470 parts of chlorotoluene are heated to the boiling point as indicated in Example 2 together with 100 parts of magnesium and 2.4 parts of cuprous chloride, whereby the Grignard compound is formed in the manner indicated above. In this case likewise a smaller quantity of chlorotoluene may be used at the beginning and the rest may be introduced during the reaction. This feature is especially valuable when using a highly activating catalyst, such as aluminum chloride or bromide. Furthermore, one of the diluents mentioned in Example 2, may be added.

The arylmagnesium chlorides of the benzene series are easily reacted with alkylene oxides, especially ethylene oxide, in order to produce phenylethyl alcohol. Thus, for instance, the organomagnesium compound may be dissolved in benzene, and to this solution either gaseous ethylene oxide or dissolved in an organic liquid, may be added. The reaction product thus obtained, is decomposed with dilute sulfuric acid, whereby the phenylethyl alcohol is obtained in a very good yield.

I have found, however, that in the production of $\beta$-phenylethyl alcohol and its homologous compounds the formation of the Grignard compound and its reaction with alkylene oxide may be performed in a single stage. The easily volatile alkylene oxide reacts with the organo-magnesium compound in a medium heated to the boiling point of the chlorobenzene without loss of ethylene oxide. Thus, cooling of the organomagnesium compound during the reaction with ethylene oxide, held necessary until yet, may be dispensed with and the whole reaction may be performed in an essentially shorter time and in a very simple apparatus. Furthermore, the phenyl magnesium chloride formed in the first stage of reaction, is transformed with alkylene oxide into the stable phenyl alkoxy magnesium chloride and thus protected from a further reaction with chlorobenzene under formation of diphenyl. Thus, the quantity of by-products is diminished and the yield is essentially improved.

*Example 6.*—150 parts of magnesium turnings having a clean surface, are heated under reflux together with 400 parts of chlorobenzene to the boiling point of the latter. After a short time the reaction begins, recognizable on a turbidity in the liquid. In the course of 1 to 3 hours further 1700 parts of chlorobenzene are introduced, while boiling of the mixture is continued. Then, in the course of 2 to 4 hours, a solution of 200 parts of ethylene oxide dissolved in 300 parts of chlorobenzene are slowly added during 2 to 4 hours; the whole reaction is finished in about 5 to 6 hours. The reaction mass is treated with diluted sulfuric acid and worked up in the usual manner to separate the phenylethyl alcohol formed, the chlorobenzene used in excess, being recovered and used for a new reaction.

In this process, a greater amount of ethylene oxide as theoretically required, may be introduced in the liquor containing the organo-magnesium compound. This ethylene oxide in excess likewise may be recovered, for instance, by absorption in an organic solvent.

Instead of chlorobenzene in an analogous manner its homologous compounds may be used as a parent material.

Instead of the freshly produced magnesium turnings with a clean surface the usual magnesium powders or turnings recommended for the Grignard reaction, may be used in the presence of one of the activators mentioned in the foregoing examples.

What I claim is:—

1. In the manufacture of aromatic alcohols of the general formula $$R-CH_2 \cdot CH_2 \cdot OH,$$

wherein R means a radical of the benzene series, by acting with ethylene oxide upon the corresponding phenylmagnesium chloride, the step which comprises producing such phenylmagnesium chloride by reacting the corresponding chlorobenzene at its boiling point at ordinary pressure and in absence of ether with magnesium having a clean unoxidized active surface.

2. In the process set forth in claim 1, the step which comprises activating the surface of magnesium by adding to the reaction mixture a halide of the group consisting of cuprous halides, silver halides, aluminum halides, anhydrous magnesium halides, organo-magnesium halides, and phosphorus tribromide.

3. In the manufacture of $\beta$-phenylethyl alcohol by acting with ethylene oxide upon phenylmagnesium chloride, the step which comprises producing the phenylmagnesium chloride by reacting chlorobenzene at its boiling point at ordinary pressure and in absence of ether with magnesium having a clean unoxidized active surface.

4. The process which comprises reacting chlorobenzene at its boiling point and at ordinary pressure in the absence of ether with magnesium having a clean unoxidized active surface, introducing ethyleneoxide into the heated reaction mixture and decomposing the reaction product to form $\beta$-phenylethyl alcohol.

ALBERT WEISSENBORN.